356-138.

XR  3,572,942

[11] 3,572,942

| [72] | Inventors | Gerrit Hendrik teKronnie;<br>Karel Hero Volkers, Van Breestraat 171,<br>Amsterdam, Netherlands |
|---|---|---|
| [21] | Appl. No. | 749,563 |
| [22] | Filed | Aug. 1, 1968 |
| [45] | Patented | Mar. 30, 1971 |
| [32] | Priority | Aug. 10, 1967 |
| [33] | | Netherlands |
| [31] | | 6,711,045 |

[54] POSITION INDICATING INSTRUMENT
3 Claims, 3 Drawing Figs.

[52] U.S. Cl. .................................................. 356/154,
350/162, 356/172, 356/138
[51] Int. Cl. .................................................. G01b 11/27,
G02b 5/18
[50] Field of Search........................................ 356/138,
156, 169, 170, 172, 154; 250/237 (MR); 350/162

[56] References Cited
UNITED STATES PATENTS

| 2,280,038 | 4/1942 | Powers | 33/204.1 |
| 2,390,122 | 12/1945 | Powers | 356/169 |
| 2,451,972 | 10/1948 | Powers | 356/169 |
| 2,929,631 | 3/1960 | Gillon | 356/138 |
| 2,991,743 | 7/1961 | Ogle | 356/138 |

FOREIGN PATENTS

| 588,575 | 1959 | Canada | 356/152 |

*Primary Examiner*—Ronald L. Wibert
*Assistant Examiner*—J. Rothenberg
*Attorney*—Arthur B. Colvin ABSTRACT: An instrument enabling a distant observer to locate a point in a plane of reference defined by the instrument. It contains two line grid structures spaced apart in planes perpendicular to the reference plane and presenting a symmetrical phantom or moiré pattern to a distant observer when in the reference plane. The grid halves of one screen on both sides of the reference plane are slightly angularly displaced with respect to the corresponding halves of the other screen to provide moiré bars which are coincident at the centerline as a test for symmetry.

Patented March 30, 1971
3,572,942
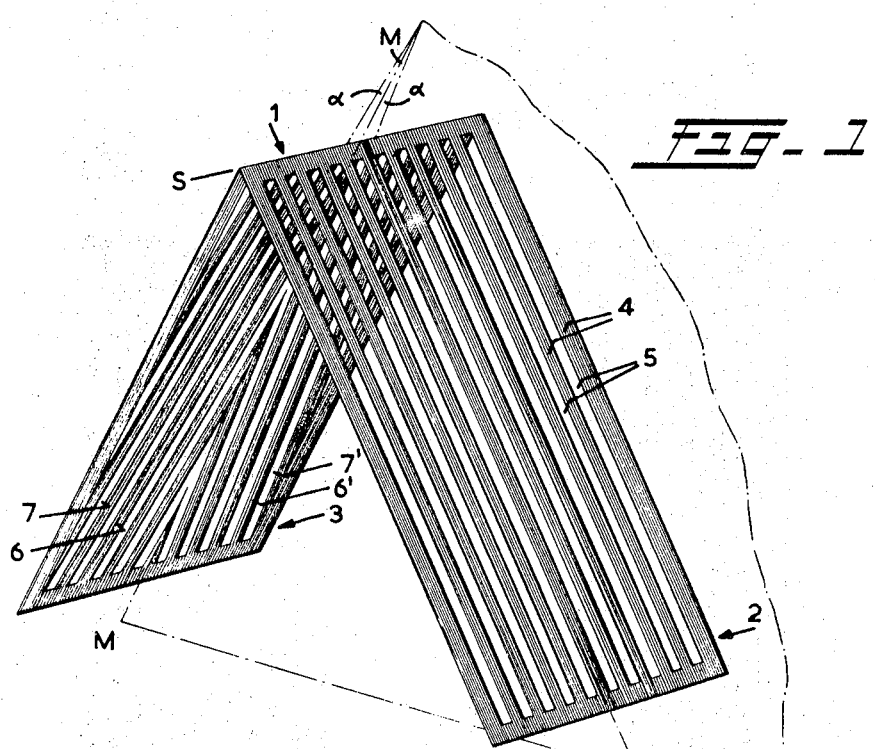
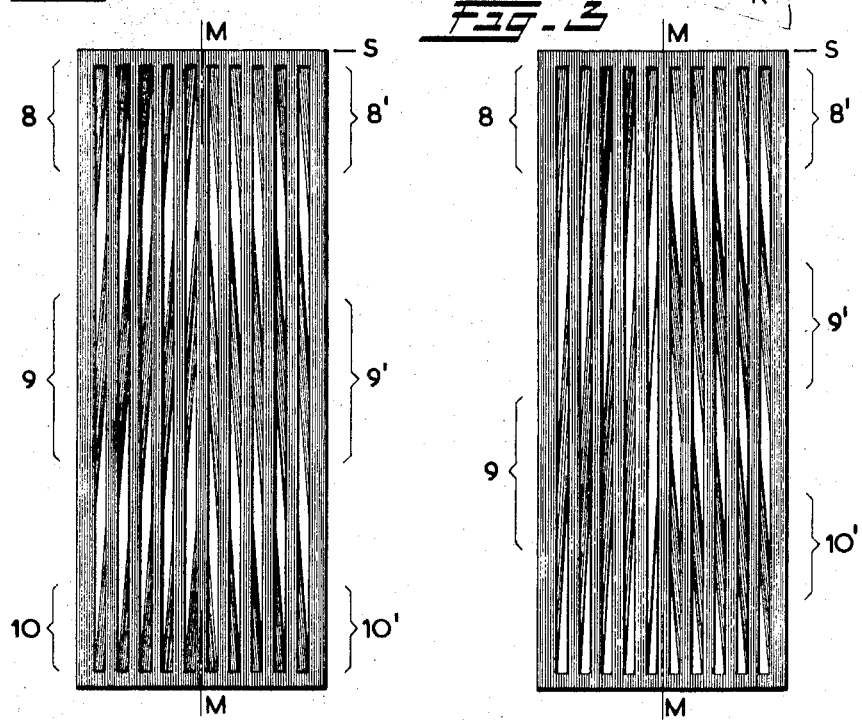
INVENTORS
GERRIT HENDRIK TE KRONNIE
KAREL HERO VOLKERS
BY

POSITION INDICATING INSTRUMENT

This invention relates to an instrument for rendering to a distant observer a visual indication of the position of a point relative to a plane of reference established by the instrument, more particularly for the purpose of locating such point in the plane of reference. Instruments of this type may find useful application with various kinds of work, such as leveling terrains, installing pipe lines and cables, marking the fairway of ships, erecting walls etc., and, generally, in all cases where the position of objects relative to horizontal, vertical or inclined planes must be controlled in a simple yet precise manner.

The invention utilizes a well-known optical phenomenon, hereinafter to be referred to as "moiré-effect," which may be achieved by placing two mutually similar line grids one behind the other at a mutual distance, such that the rearmost grid is seen through the foremost one. The grids will then generally form phantom or superposition patterns of alternating dark and light zones or bars having a much coarser structure than the line grids themselves so that these bars can be clearly distinguished at long distances. Generally, these moiré patterns will change in appearance when varying the place from which they are observed. For instance, the number of moiré bars seen in the grids will normally decrease when the observer moves away from the grids. It has already been proposed to utilize this last-mentioned phenomenon for the purpose of estimating distances. The moiré pattern may also be dependent on the direction from which the observer views at the grids. More specifically, it is sensitive for movements of the observer in a direction crosswise to the lines of the grids.

It is an object of the present invention to provide a relatively simple yet precise instrument for indicating the position of a point relative to a reference plane which is based on the last-mentioned phenomenon. More specifically, it is an object of the invention to provide an instrument whose moiré pattern renders an easily applicable test for accurately determining whether a point is in the plane of reference.

To achieve these and other objects the invention contemplates an instrument comprising two screens located at a mutual distance in planes which are both perpendicular to the plane of reference. Each screen comprises two grid patterns made up of substantially parallel lines, i.e. one pattern on each side of the plane of reference, and the two grid patterns of each screen are mutually symmetrical with respect to the plane of reference. It is an essential characteristic of the invention that the grid patterns of one screen are rotated a small angle in the plane of the screen relative to the corresponding grid patterns of the other screen.

In one preferred embodiment of the invention all grid lines of one screen may be parallel to the plane of reference whereas the lines of the two grid patterns of the other screen are at mutually equal but opposite angles with respect to the plane of reference. With an instrument thus constructed an observer having his eye in the plane of reference will view a pattern of moiré bars which is symmetrical with respect to the plane of reference and has the characteristic feature that there are corresponding bars in both pattern halves on opposite sides of the line of intersection with the reference plane which meet each other exactly at said line of intersection. Such coincidence of corresponding bars enables the observer to decide easily and with great precision whether he is actually in the plane of reference. If he moves even slightly out of that plane the bars on either side of the reference plane will move in mutually opposite directions, e.g. if the plane of reference is vertical the bars in the left half of the moiré pattern may move upward and in the right half downward, so that the coincidence of corresponding bars gets lost.

If the two screens containing the grid patterns are mounted in mutually parallel relationship the moiré bars will be substantially straight, and the angle at which they meet the reference plane will of course depend on the angular position of the grid lines. If, more particularly, the grid lines run parallel to the reference plane, the meeting angle referred to will be right. To avoid ambiguity in determining the plane of reference it is necessary to make sure that the moiré bars which are brought to coincidence are indeed corresponding ones. This may not always be simple if mutually parallel screens are used since in that case the moiré bars in each half of the pattern are all rather similar in appearance and can not easily be identified.

Preferably, therefore, in the instrument of the present invention the screens will be placed in planes intersecting each other along a line beyond the useful grid area. As a result, the width and the number of the moiré bars occurring in either half of the pattern become dependent on the direction in which the observer moves out of the reference plane, and on the magnitude of such movement. Accordingly, any difference in numbers or width of bars which the observer may note in both pattern halves provides an indication as to which side of the reference plane he is on and even, roughly, as to how far he will have to move to reach such plane. This effect is yet further supported by the fact that the moiré bars attain typically curved shapes which greatly facilitate the search for the symmetrical pattern which is indicative of the plane of reference. Once this pattern being found, the observer can, for final adjustment, apply the above-mentioned test of corresponding moiré bars coinciding at the line of intersection.

A quick and precise reading of the instrument, especially at greater distances, is facilitated by making the number of moire bars over the grid area small. This is achieved by selecting a small value for the angle through which the grid patterns of one screen are rotated relative to those of the other screen. Accordingly, in the preferred embodiment of the invention that angle will correspond to three periods of the line grids at most, taken over the entire dimension of the screens in the direction of the lines.

A particularly simple construction of the instrument according to the invention can be obtained if the line grid patterns are formed by opaque wires stretched between supporting rods having equidistant indentations, a plurality of wires being omitted at the places where the reference plane intersects the screens so as to provide a visible indication of the reference plane in the pattern observed.

Details of the invention will now be discussed with reference to the annexed drawing illustrating an embodiment thereof. In the drawing:

FIG. 1 is a diagrammatical perspective view of an instrument providing a vertical reference plane;

FIG. 2 illustrates the moiré pattern as viewed from a point in the reference plane; and FIG. 3 illustrates the moiré pattern as viewed from a point on the left of the reference plane.

The instrument which is generally designated 1 has a front screen 2 on the side of the observer, and a rear screen 3. The front screen is provided with a line grid pattern formed by a number of opaque parallel bars 4 of mutually equal width which are spaced apart by slots 5 of the same width. Though the bars 4 are shown as formed of thin strip material it will be understood that this is not essential.

The rear screen 3 is also provided with a grid pattern which is similar to the pattern formed by the bars 4 with the exception that the dark strips 6 of the left half intersect the upright middle line M–M of the rear screen at a small angle $\alpha$ whereas the strips 6' of the right half of the screen intersect the line M–M at the same angle $\alpha$, now however with the opposite sign. The strips 6 and 6' may be opaque bars similar to the bars 4 of the front screen and spaced apart by slots 7 and 7' of the same width as the strips or, alternatively, they may be dark-colored zones applied to a solid base and having zones 7 and 7' of contrasting color between them.

To enhance the contrast in the resulting moire patterns it is desirable that the widths of lines as well as spaces in the two screens be made approximately equal. However, small deviations from this condition can be tolerated.

The front and rear screens are disposed at an angle so as to intersect each other in the line S lying beyond the useful screen area. The perpendicular plane through the middle of S is the reference plane R established by the instrument. It will be seen that in each screen the grid patterns on opposite sides of the reference plane are mutually symmetrical with respect to the line along which the plane R intersects the screen.

In the embodiment shown the dark lines 6, 6' in the rear screen meet the spaces 5 between the bars of the front screen at the intersection line S. Or, in other words, there exists a phase shift of one half period between the grid patterns at the intersection. In that case a distant observer having his eye in the reference plane R and looking on to the front screen will observe a symmetrical moiré pattern essentially as illustrated in FIG. 2. There appear equal numbers of horizontal dark bars 8, 9, 10 and 8', 9', 10', respectively, in the left and right half of the front screen. Corresponding bars are equal in width and meet each other exactly in the middle of the screen. If the observer moves out of the reference plane R to the left, however, the pattern will change as seen in FIG. 3. Even a slight displacement of the observer causes substantial vertical shifts in mutually opposite directions of the moiré bars in the respective screen halves. Thus, the bar 9 in FIG. 3 has moved downward, whereas the bars 9' and 10' have both moved up. In FIG. 3 the original bar 10 has even disappeared from the left screen half. Accordingly, there is no longer a coincidence of corresponding moiré bars such as 9 and 9' at the middle line M—M.

It will be understood that the effect of the half period phase shift at the intersection line S can not be influenced by any displacement of the observer. Accordingly, the bars 8 and 8', though they may vary in width, will always stay where they are. The parts of the screens adjacent the intersection may therefore be omitted as well, to thereby reduce the dimensions of the instrument.

From a comparison of FIGS. 1 and 2 it will be seen that, in the embodiment illustrated, the angle of rotation has been selected so that the resulting phase shift between the front and rear grids amounts to two full line periods over the full height of the screen. This means that, if viewing from a distance which is very long compared with the average spacing between the screens, only one bar, i.e. 9, 9', will be fully comprised in the symmetrical moiré pattern of FIG. 2. Generally, the reading of the instrument will be the more precise the fewer and larger the moire bars are.

Though this may not be easily demonstrated in a drawing, the moiré bars produced by a practical roof-shaped configuration as shown in FIG. 1 will generally have a typical pronounced curved shape which also is strongly dependent on the direction of viewing. As stated hereinbefore this may give valuable additional support to the observer while searching for the reference plane. Of course, the screens 2, 3 may be mounted in a suitable housing (not shown) for support and protection and the housing may be provided with conventional sighting and levelling means to facilitate the correct positioning of the instrument. White panels or suitable planar artificial light sources may be mounted behind the rear screen to improve the contrast and visibility of the moiré pattern and make the device suitable for use at night. If the rear screen is a solid panel with lines in contrasting colors, light sources may be built into the housing to provide a sufficient lighting of the rear screen.

In a practical embodiment each of the screens may be approximately 30×30 cm. in size the grid patterns may have bars of 3 mm. spaced apart by slots of 3 mm. The roof angle between the front and rear grids over the full height of the screen one full period. It could be shown that such an instrument permits sighting the reference plane with a precision better than 1 cm. at a distance of 60 meters. Even much higher accuracies may be obtained if finer grid patterns are used. These can be produced in a variety of ways, such as by etching lines in glass plates or by using photographic reproduction techniques.

Many advantages can be had by forming the grid patterns of opaque wires which are stretched between spaced supporting rods having suitable equidistant indentations, such as may be provided by a screw thread. On both sides of the intersection line with the reference plane where the two grid patterns of each screen meet each other some wires may be omitted. The narrow empty zone thus obtained presents itself in the moire pattern as a clear line or bar separating the two halves and representing the reference plane, which greatly adds to the convenience in orientation of the observer.

We claim:

1. An instrument for rendering to a distant observer a visual indication of the position of a point relative to a plane of reference established by the instrument, comprising two screens positioned one behind the other so as to enable the observer to view the rear screen through the front screen, said screens lying in planes which are both perpendicular to the plane of reference and intersect each other at an acute angle along a line beyond the optically useful screen area, each screen comprising two grid patterns one on either side of the plane of reference, each pattern composed of substantially parallel opaque lines and intermediate clear spaces of substantially the same width as said lines and all the grid patterns having substantially the same line width, the two grid patterns of each screen being mutually symmetrical with respect to the plane of reference, and the grid patterns of one screen being rotated a small angle in the plane of the screen relative to the corresponding grid patterns of the other screen to thereby produce a moiré pattern which, when viewed from a distant point in the plane of reference, has corresponding light and dark bars on either side of the plane of reference which meet each other exactly at the plane of reference.

2. An instrument as claimed in claim 1, wherein all grid lines of one screen are parallel to the plane of reference whereas the lines of the two grid patterns of the other screen are at mutually equal but opposite angles with respect to the plane of reference.

3. An instrument as claimed in claim 1, wherein the angle through which the grid pattern of one screen have been rotated relative to the corresponding grid patterns of the other screen corresponds to three periods of the line grids at most, taken over the entire dimension of the screens in the direction of the grid lines.